(12) United States Patent
Shankar

(10) Patent No.: US 8,322,747 B2
(45) Date of Patent: Dec. 4, 2012

(54) INFLATABLE AIRBAG ASSEMBLIES WITH ARM-MANIPULATING SIDE AIRBAGS

(75) Inventor: Balaskandan Shankar, Salt Lake City, UT (US)

(73) Assignee: Autoliv ASP, Inc., Ogden, UT (US)

(*) Notice: Subject to any disclaimer, the term of this patent is extended or adjusted under 35 U.S.C. 154(b) by 102 days.

(21) Appl. No.: 12/836,127

(22) Filed: Jul. 14, 2010

(65) Prior Publication Data
US 2012/0013107 A1  Jan. 19, 2012

(51) Int. Cl.
*B60R 21/207* (2006.01)
(52) U.S. Cl. .................... 280/729; 280/730.2
(58) Field of Classification Search .......... 280/729, 280/730.2, 743.1, 743.2
See application file for complete search history.

(56) References Cited

U.S. PATENT DOCUMENTS

| 5,454,595 | A | | 10/1995 | Olson et al. | |
|---|---|---|---|---|---|
| 5,730,464 | A | * | 3/1998 | Hill | 280/743.2 |
| 5,765,863 | A | | 6/1998 | Storey et al. | |
| 6,142,517 | A | | 11/2000 | Nakamura et al. | |
| 6,425,602 | B1 | | 7/2002 | Al-Amin et al. | |
| 7,338,070 | B2 | * | 3/2008 | Madasamy et al. | 280/730.2 |
| 7,618,057 | B2 | | 11/2009 | Pinsenschaum et al. | |
| 7,780,191 | B2 | * | 8/2010 | Sato | 280/730.2 |
| 8,020,892 | B2 | * | 9/2011 | Choi | 280/743.1 |
| 2004/0188989 | A1 | | 9/2004 | Kanto et al. | |
| 2006/0012155 | A1 | | 1/2006 | Shaner et al. | |
| 2008/0185824 | A1 | * | 8/2008 | Sato | 280/730.2 |
| 2008/0252054 | A1 | | 10/2008 | Kim et al. | |
| 2009/0051151 | A1 | * | 2/2009 | Choi | 280/741 |

FOREIGN PATENT DOCUMENTS

| JP | 10067297 | 8/1999 |
|---|---|---|
| JP | 2002/362295 | 12/2002 |

OTHER PUBLICATIONS

Notification of Transmittal of the International Search Report and the Written Opinion of the International Searching Authority issued Oct. 4, 2011 in International Application No. PCT/US2011/037522.

* cited by examiner

*Primary Examiner* — Joseph Rocca
(74) *Attorney, Agent, or Firm* — Sally J. Brown; Stoel Rives LLP

(57) ABSTRACT

Inflatable side airbags are employed to cushion an occupant in the event of a side impact. An occupant's outboard arm may become trapped between a deploying side airbag and the occupant's torso. This situation may cause injury to the occupant's ribs. Side airbags can be engineered such that the occupant's arm is moved out of the way by the airbag during deployment.

20 Claims, 13 Drawing Sheets

INFLATABLE AIRBAG ASSEMBLIES WITH ARM-MANIPULATING SIDE AIRBAGS

TECHNICAL FIELD

The present disclosure relates generally to the field of automotive safety systems. More specifically, the present disclosure relates to inflatable airbag cushion assemblies with side airbags.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. Side airbags may be installed on an outboard side of an occupant's seat, or on an inboard side of a vehicle column. During installation, the airbags are rolled, folded, or both, and are retained in the packaged configuration behind a cover. During a collision event, vehicle sensors trigger the activation of an inflator, which rapidly fills the airbag with inflation gas. Thus the airbag rapidly changes confirmations from the packaged configuration to a deployed and inflated configuration.

Figure 1A:
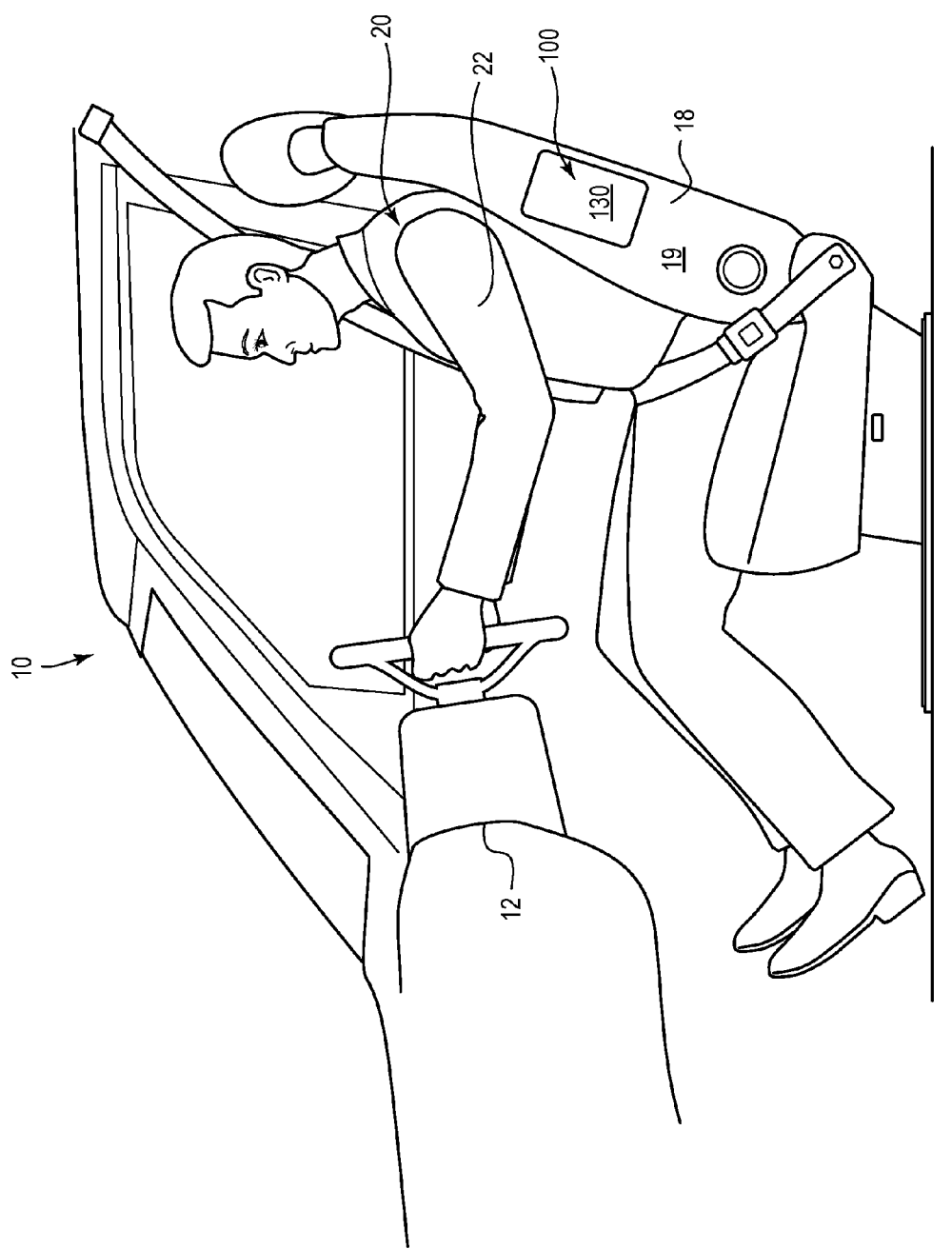
FIG. 1A is a perspective view from inside a vehicle before a side airbag has deployed.
Figure 1B:
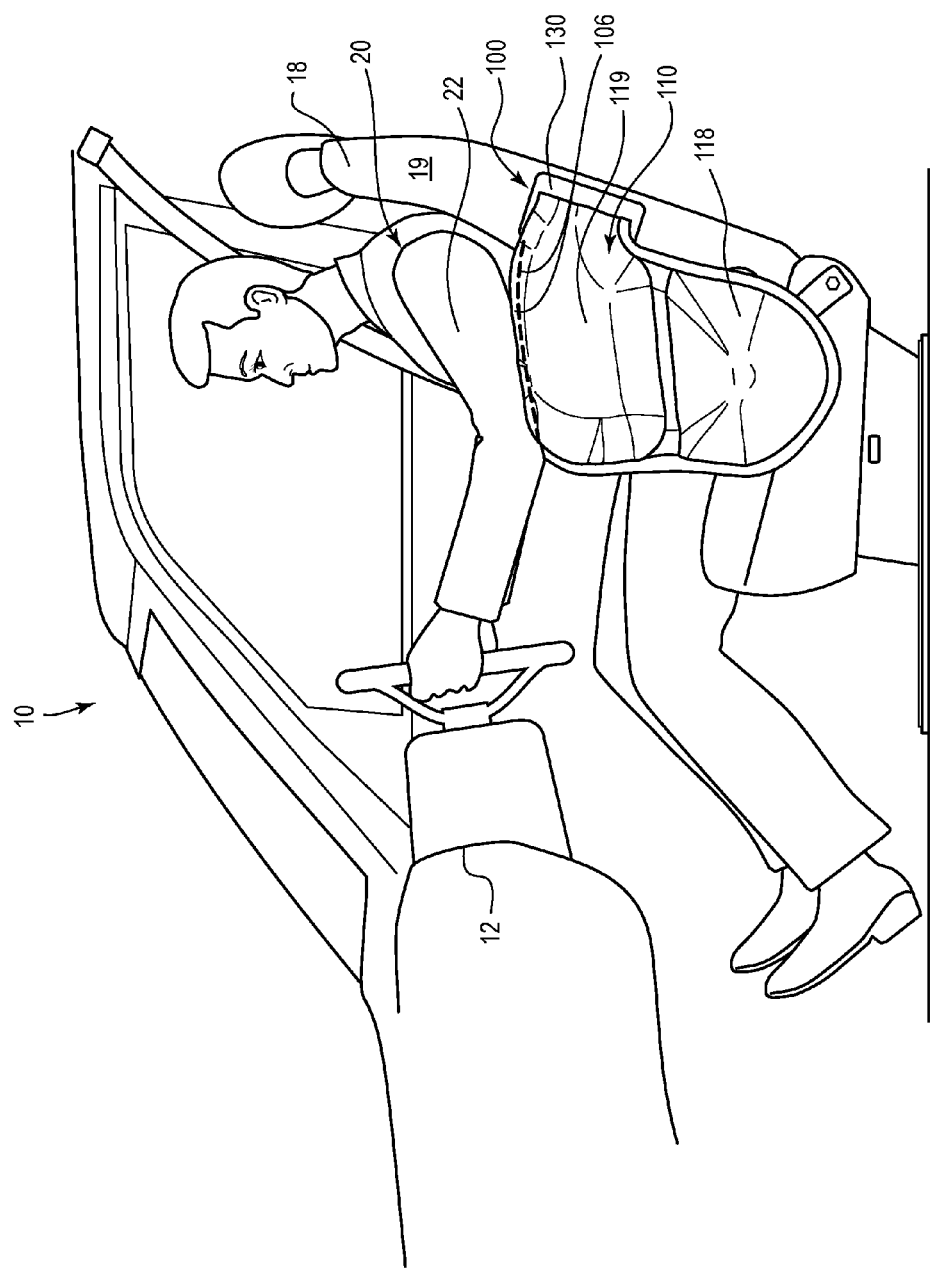
FIG. 1B is a perspective view of the vehicle of FIG. 1A after the airbag has begun to be deployed.
Figure 1C:
FIG. 1C is a perspective view of the vehicle of FIG. 1B at a later stage of airbag deployment.

FIGS. 1A-1C depict an interior of a vehicle 10, which comprises an instrument panel 12, and a vehicle seat 18, upon which an occupant 20 is seated. Seat 18 comprises an outboard side 19 on which side airbag assembly 100 may be mounted. Assembly 100 may have a cover 130 through which an airbag may deploy. In FIG. 1A, assembly 100 is in a packaged configuration. An outboard arm 22 of occupant 20 may be in an extended position, as depicted. One skilled in the art will recognize that the airbag assembly may be located on a driver's side front seat, driver's side rear seat, passenger's side front or passenger's side rear seat. Further, one skilled in the art will recognize that the occupant's outboard arm may be in any starting position and is not limited to the depicted position.

FIG. 1B depicts inflatable airbag assembly after inflatable deployment has begun and may be more specifically described as depicting an early or a mid-stage of deployment. The terms, "early," "mid-," and "late" stages of airbag deployment are not intended to indicate specific stages or elapsed times of airbag deployment; rather, the terms are meant to indicate a general sequential progression of airbag deployment. As such, early airbag deployment occurs before mid-airbag deployment, and mid-airbag deployment occurs before late airbag deployment. Early airbag deployment may refer to any time point during inflatable airbag deployment before the airbag is fully deployed and/or inflated.

In FIG. 1B, airbag 110 has emerged from behind cover 130 and a lower chamber 118 has at least partially inflated with inflation gas from an inflator. An upper chamber 119 has begun to inflate. Lower and upper chambers 118 and 119 may also be described as lower and upper regions of airbag 110. Depending on the position of arm 22 of occupant 20, upper chamber 119 of airbag 110 may contact the occupant's outboard arm before a top portion (not shown) has fully deployed and/or inflated. Timing of deployment of the top portion may be delayed by tucking and/or sewing with tear stitching the top portion. In the depicted embodiment, the top portion has been tucked into upper chamber 119 and stitched via tear stitching 106 to the upper chamber.

In FIG. 1C, airbag 110 is in a late stage of inflatable airbag deployment, wherein the airbag has fully deployed from behind cover 130. Lower chamber 118 has deployed and been inflated, and a top portion 120 of upper chamber 119 has deployed and been inflated. For top portion 120 to become deployed and inflated, tear stitching 106 ruptures and the top portion un-tucks from upper chamber 119. In the depicted embodiment, upper chamber 119 is configured to cause top portion 120 to interact with, and manipulate, arm 22 of occupant 20. Specifically, top portion 120 of upper chamber 119 is configured to elevate and/or move in an inboard direction, outboard arm 22, such that the arm is not located between an outboard vehicle structure and the occupant's torso. With regards to the depicted embodiment, top portion 120 deploys after lower chamber 118 and then top portion 120 inflates after lower chamber 118. If an embodiment lacks distinct upper and lower chambers, the airbag may be said to comprise upper and lower regions, which may roughly coincide with upper and lower chambers 119 and 118 of airbag 110. In such embodiments, an arm-manipulating portion of the airbag deploys after a lower region of the airbag.

Upper chamber 119 of cushion 110 is the portion of the cushion that is closest to the headliner of a vehicle when the cushion is in a deployed state. Lower chamber 118 is below upper chamber 119 when cushion 110 is in a deployed state, and is closest to a floor of the vehicle. The term "lower chamber" is not necessarily limited to the portion of cushion 110 that is below a horizontal medial plane of the cushion, but may include less than half, more than half or exactly half of the bottom portion of the cushion. Likewise, the term "upper chamber" is not necessarily limited to the portion of cushion 110 that is above a horizontal medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
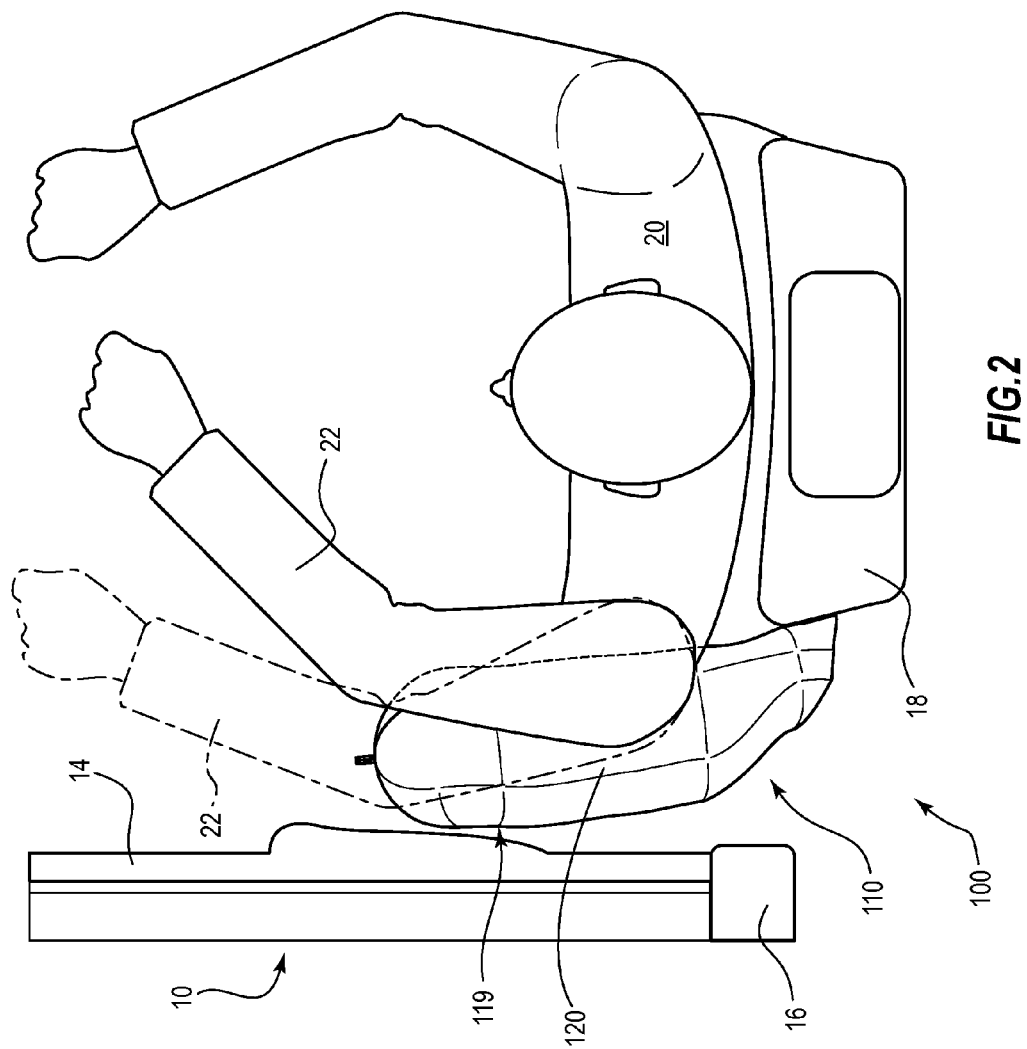
FIG. 2 is a top view of an occupant after the airbag of FIG. 1C has been fully deployed.

FIG. 2 is a top view of vehicle 10 with occupant 20 seated on seat 18, wherein airbag assembly 100 is in a deployed configuration. Airbag 110 may be described as being fully deployed and inflated. In the deployed and inflated configuration, airbag 110 is configured to substantially fill a void between the torso of occupant 20 and a vehicle structure, such as an inside surface of a car door 14, or a vehicle pillar 16. Vehicle pillars may include B-pillars and C-pillars. Top portion 120 of upper chamber 119 has contacted outboard arm 22 and moved it in an upward and inboard direction. In FIG. 2, outboard arm 22 of occupant 20 is shown in phantom before airbag 110 has been deployed and inflated and occupant's outboard arm 22 is also shown after it has been contacted and manipulated by inflatable side airbag 110.

Figure 3:
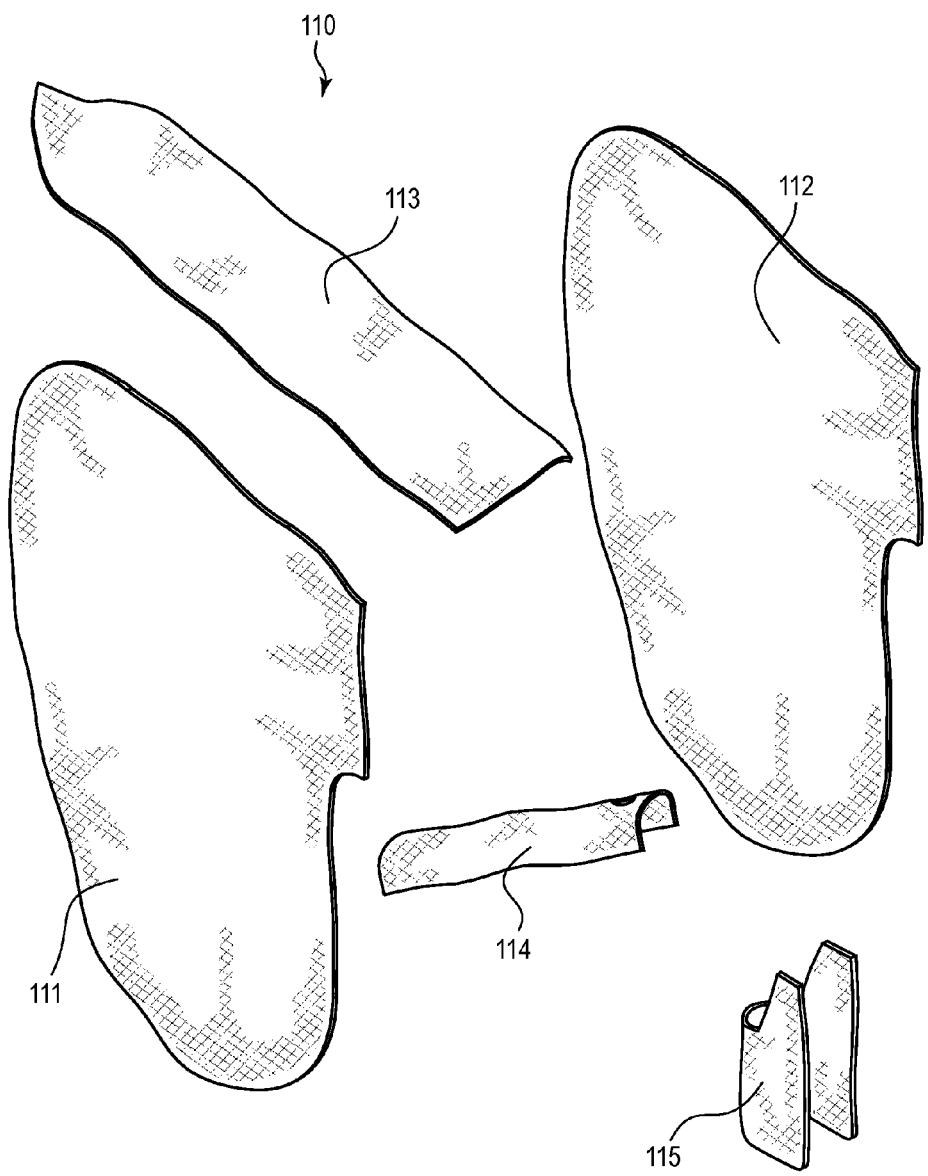
FIG. 3 is a perspective view of panels of material from which the airbag shown in FIG. 1C can be formed.

FIG. 3 is a perspective view of a plurality of panels of material from which airbag 110 can be formed. Airbag 110 may comprise an outboard panel 111, an inboard panel 112, a top panel 113, an internal tether 114, and a throat panel 115. Internal tether 114 may comprise one or more chamber to chamber vents, which allow inflation gas to travel from the lower chamber to the upper chamber, and vice versa.

Figure 4A:
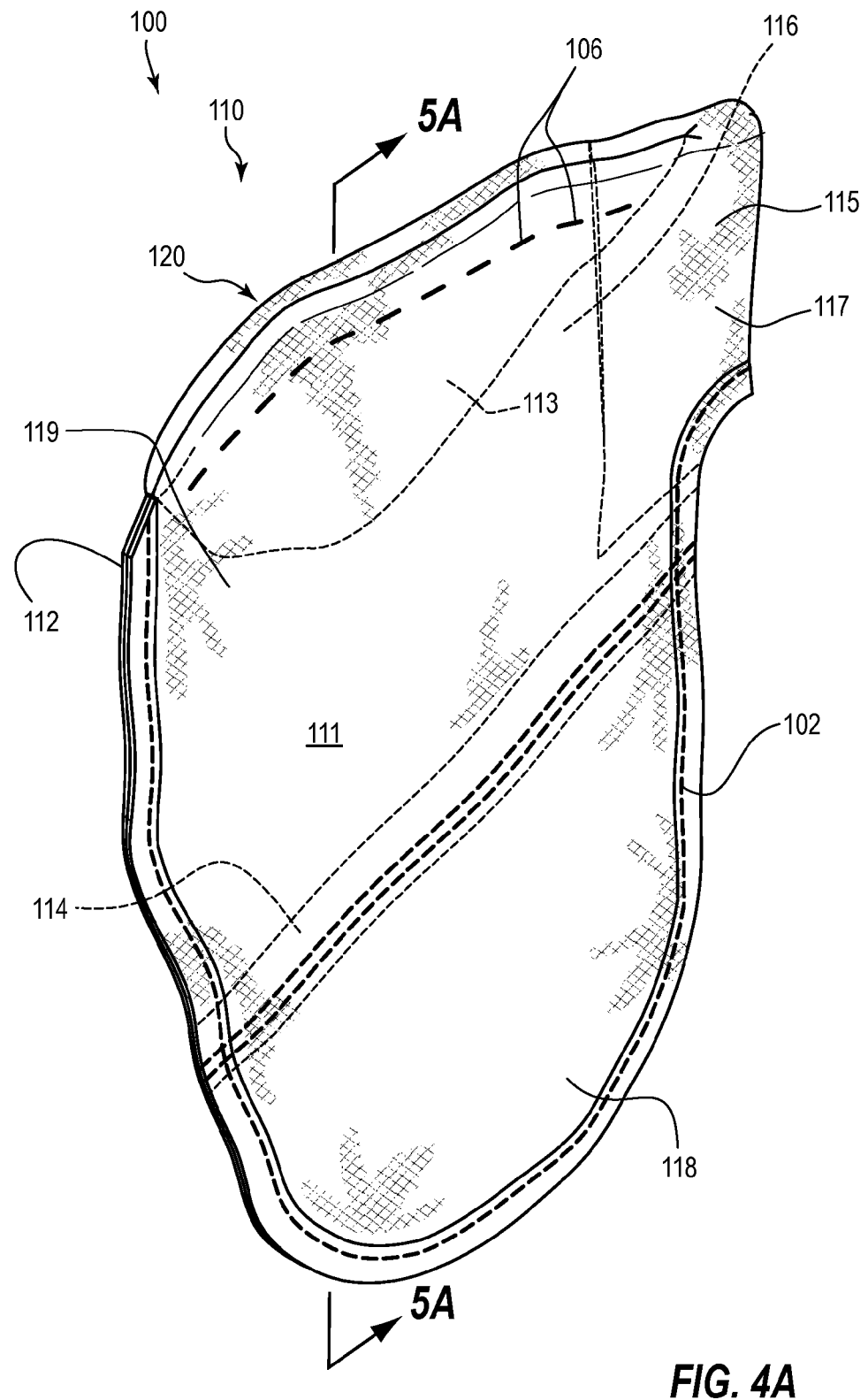
FIG. 4A is a perspective view of the airbag of FIG. 1C, wherein the airbag is in an un-inflated state.
Figure 4B:
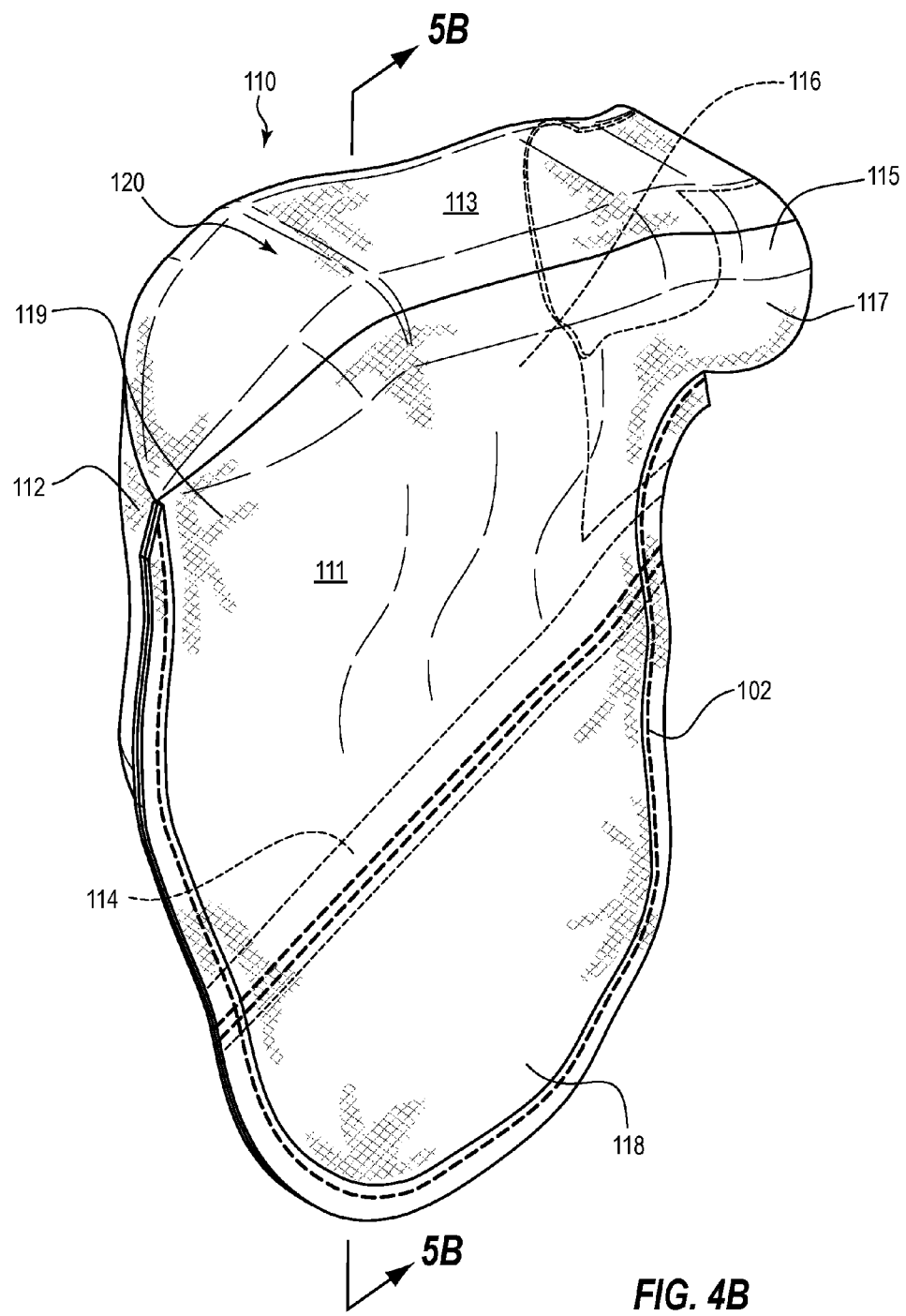
FIG. 4B is a perspective view of the airbag of FIG. 4A, wherein the airbag is in an inflated state.

FIGS. 4A-4B depict the panels of material of FIG. 3 after the panels have been assembled to form airbag 110. FIG. 4A depicts airbag 110 in an un-inflated state and FIG. 4B depicts the airbag in an inflated state. In the depicted embodiment, inboard panel and outboard panels 111 and 112 have been coupled together via a perimeter seam comprising stitching 102. Inboard and outboard panels 111 and 112 have also been coupled together via internal tether 114, which is located between the inboard and outboard panels. Each of the inboard and outboard panels 111 and 112 may be attached to internal tether 114. Top panel 113 may be attached to each of the inboard and outboard panels, as well as throat panel 115, which itself may be coupled to each of the inboard and outboard panels. Top portion 120 may comprise all of, or a portion of, top panel 113. Top portion 120 may also comprise a portion of throat panel 115, as well as panels 111 and 112. Top portion 120 may generally be described as that portion of airbag 110 that interacts with and/or manipulates an occupant's arm, or causes the occupant's arm to be manipulated.

In FIG. 4A, a portion of upper panel 113 and throat panel 115 has been tucked into upper chamber 119 and retained in a tucked configuration via tear stitching 106. In one embodiment, tear stitching 106 includes, no more than 25 threads per 100 millimeters, although one skilled in the art will appreciate that other thread counts may similarly allow the rupture of stitching 106 during deployment without damaging cushion 110. Thus, tear stitching 106 is configured to rupture during deployment of cushion 110 without damaging the cushion. Portions of upper panel 113, inboard panel 111, outboard panel 112 and throat panel 115 may comprise a throat portion 117 of airbag 110. When coupled together, the various panels form an inflatable void 116. In FIG. 4B, pressure from inflation gas has caused the tear stitching to rupture and allowed top portion 120 to un-tuck from within upper chamber.

Figure 5A:
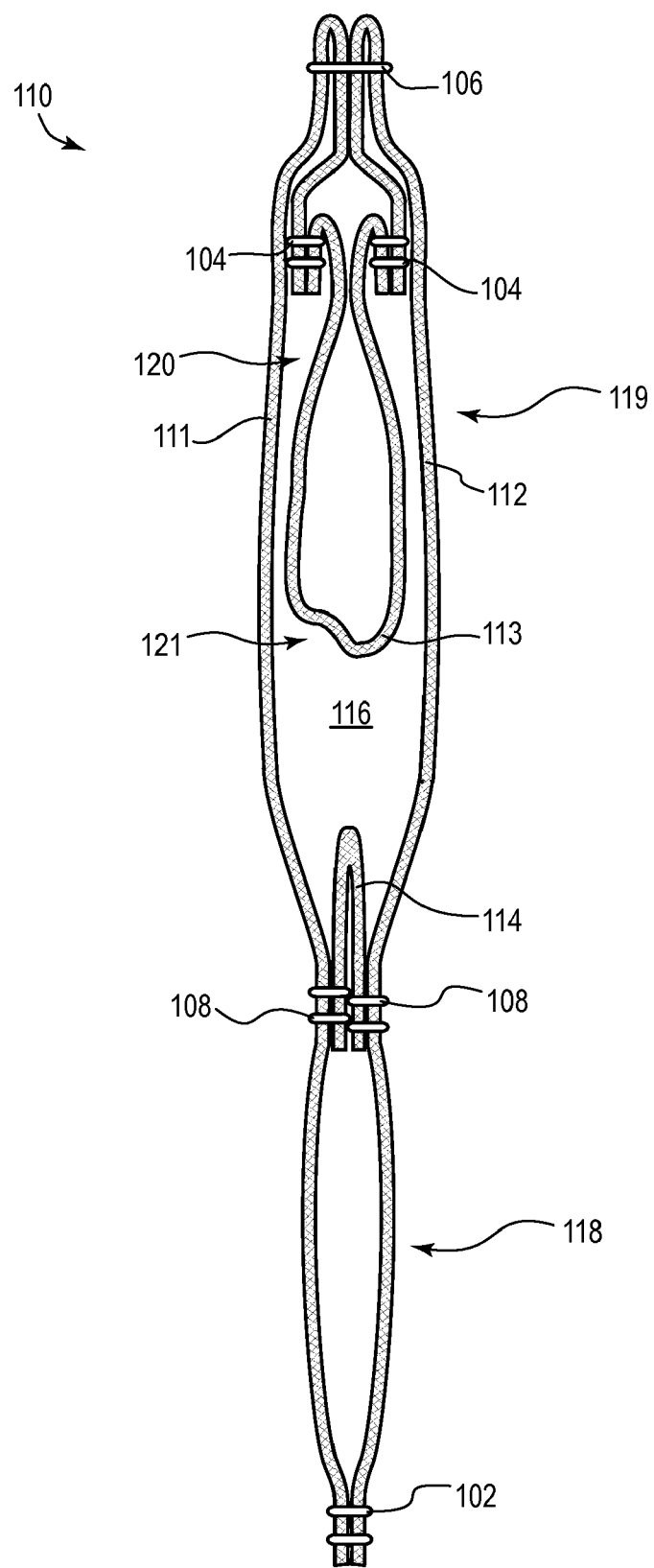
FIG. 5A is a cross-sectional view of the airbag shown in FIG. 4A.
Figure 5B:
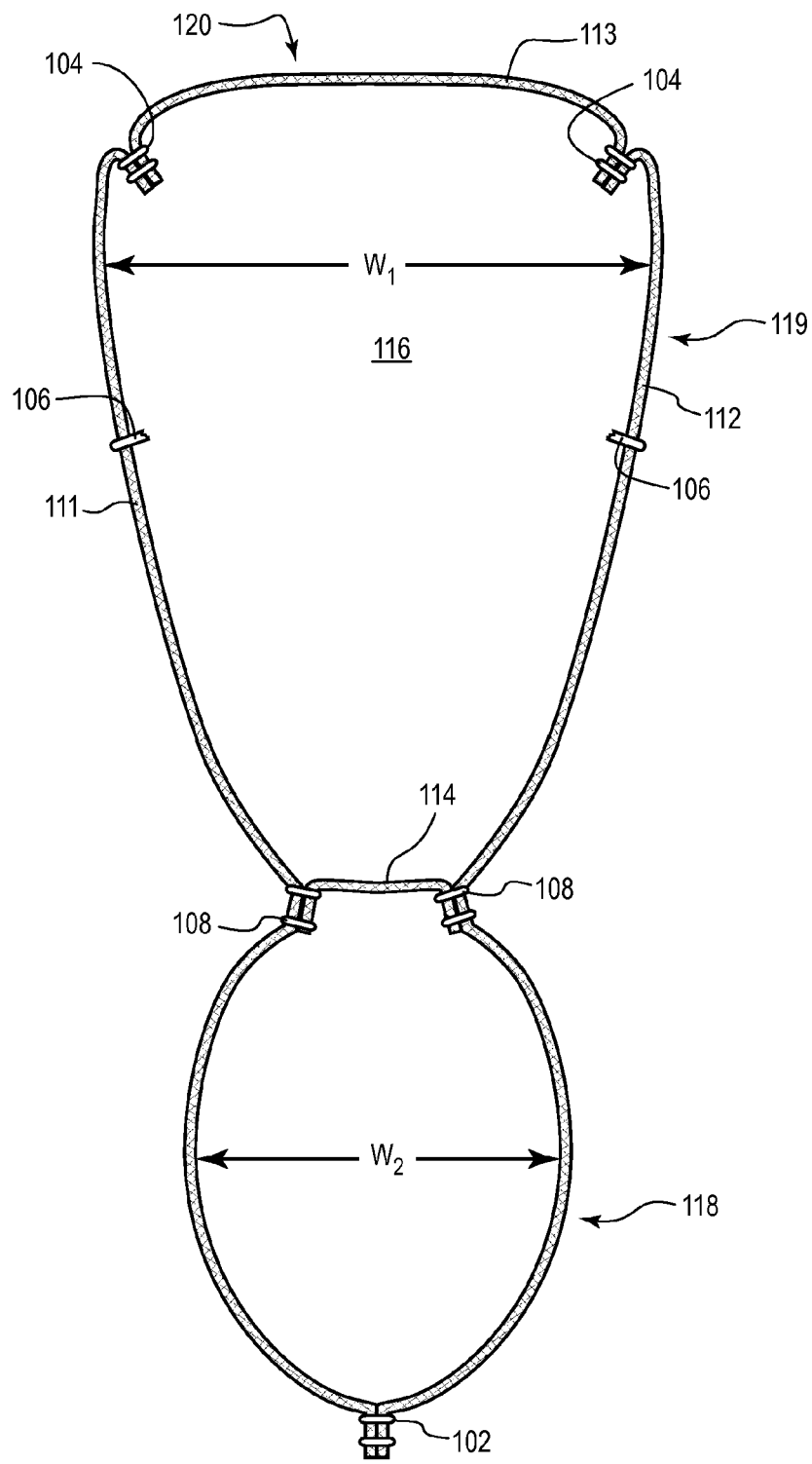
FIG. 5B is a cross-sectional view of the airbag shown in FIG. 4B.

FIGS. 5A-5B depict transverse cross-sectional views of airbag 110, wherein the airbag is in an un-inflated and tucked configuration in FIG. 5A, and an inflated configuration in FIG. 5B. Inboard and outboard panels 111 and 112 may be coupled together at a seam 102, which may comprise stitching. Top panel 113 may be coupled to each of the inboard and outboard panels 111 and 112 via other seams 104, which may also comprise stitching. Internal tether 114 may be coupled to each of the inboard and outboard panels 111 and 112 via stitching 108. Internal tether 114 at least partially defines a division between upper chamber 119 and lower chamber 118. When coupled together, the various panels form inflatable void 116. In FIG. 5A, top portion 120 comprises a tuck 121 that extends into upper chamber 119 and is retained in the tucked configuration via tear stitching 106. In the depicted embodiment, a portion of top panel 113 is tucked into upper chamber 119. Upon activation of an inflator, inflation gas applies tension to tear stitching 106 to rupture the stitching to enable top portion 120 to exit upper chamber 119 such that the top portion un-tucks and adopts the deployed and inflated configuration.

When inflated, an average cross-sectional width $W_1$ of upper chamber 119 is greater than an average cross-sectional width $W_2$ of lower chamber 118. The difference in the average cross-sectional width of upper chamber 119 and lower chamber 118 is primarily caused by outboard panel 111 and inboard panel 112 being sewn together at seam 102 at lower chamber 118 and the inboard and outboard panels having top panel 113 being located between the inboard and outboard panels. The difference in the average cross-sectional width of upper chamber 119 and lower chamber 118 may also be partially determined by a width and location of internal tether 114. The widths $W_1$ and $W_2$ may vary based on an initial gap between the occupant and interior of door 14. In some embodiments, $W_1$ may be between about 130 mm and about 190 mm. In some embodiments, $W_2$ may be between about 100 mm and 170 mm. One skilled in the art will recognize that $W_1$ and $W_2$ may vary based on vehicle interior characteristics.

Figure 6:
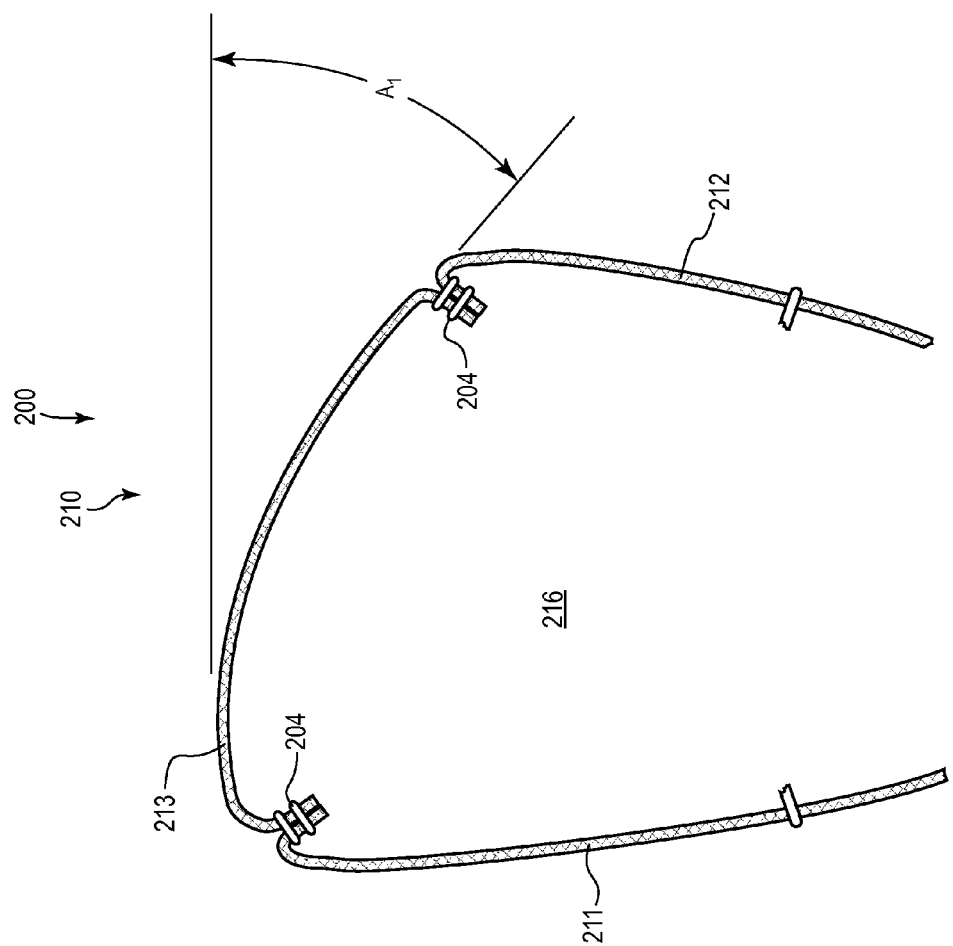
FIG. 6 is a cross-sectional view of a portion of another embodiment of an arm-manipulating inflatable side airbag.

FIG. 6 is a cross-sectional view of a portion of another embodiment of an inflatable side airbag 210, wherein airbag 210 resembles airbag 110, described above, in certain respects. Accordingly, like features may be designated with like reference numerals, with the leading hundreds numeral incremented from "1" to "2". Any suitable combination of the features described with respect to airbag 110 can be employed with airbag 210, and vice versa.

In FIG. 6, airbag 210 comprises a component of airbag assembly 200, wherein the airbag has an outboard panel 211, an inboard panel 212, and a top panel 213. Top panel 213 may be coupled to each of the outboard and inboard panels 211 and 212 via stitching 204. In the depicted embodiment, outboard panel 211 comprises a greater length than inboard panel 212, such that an attachment point of top panel 213 to outboard panel 211 may be said to be higher than an attachment point of top panel 213 to inboard panel 212. As a result, when airbag 213 is inflated, an angle $A_1$ may be formed by top panel 213. Angle $A_1$ may also be said to be formed by a horizontal plane extending from a junction of outboard panel 211 and top panel 213 and a plane running from the junction of the outboard panel and the top panel to a junction of inboard panel 212 and the top panel. Angle $A_1$ may comprise an angle between about 5° and about 30°. An angled top panel, such as disclosed above, may be described as "beveled".

Figure 7A:
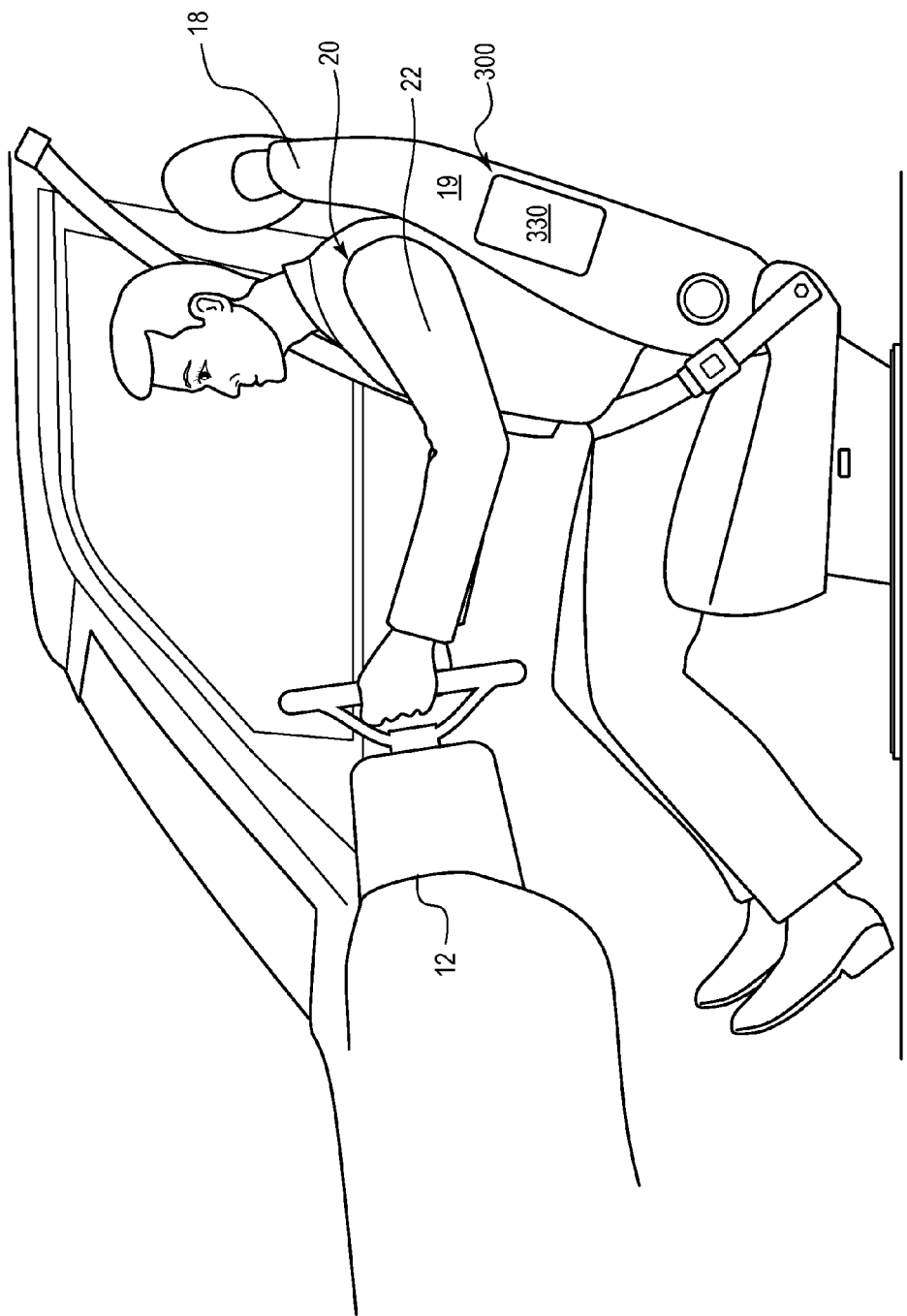
FIG. 7A is a perspective view from inside a vehicle before another embodiment of an arm-manipulating side airbag has deployed.
Figure 7B:
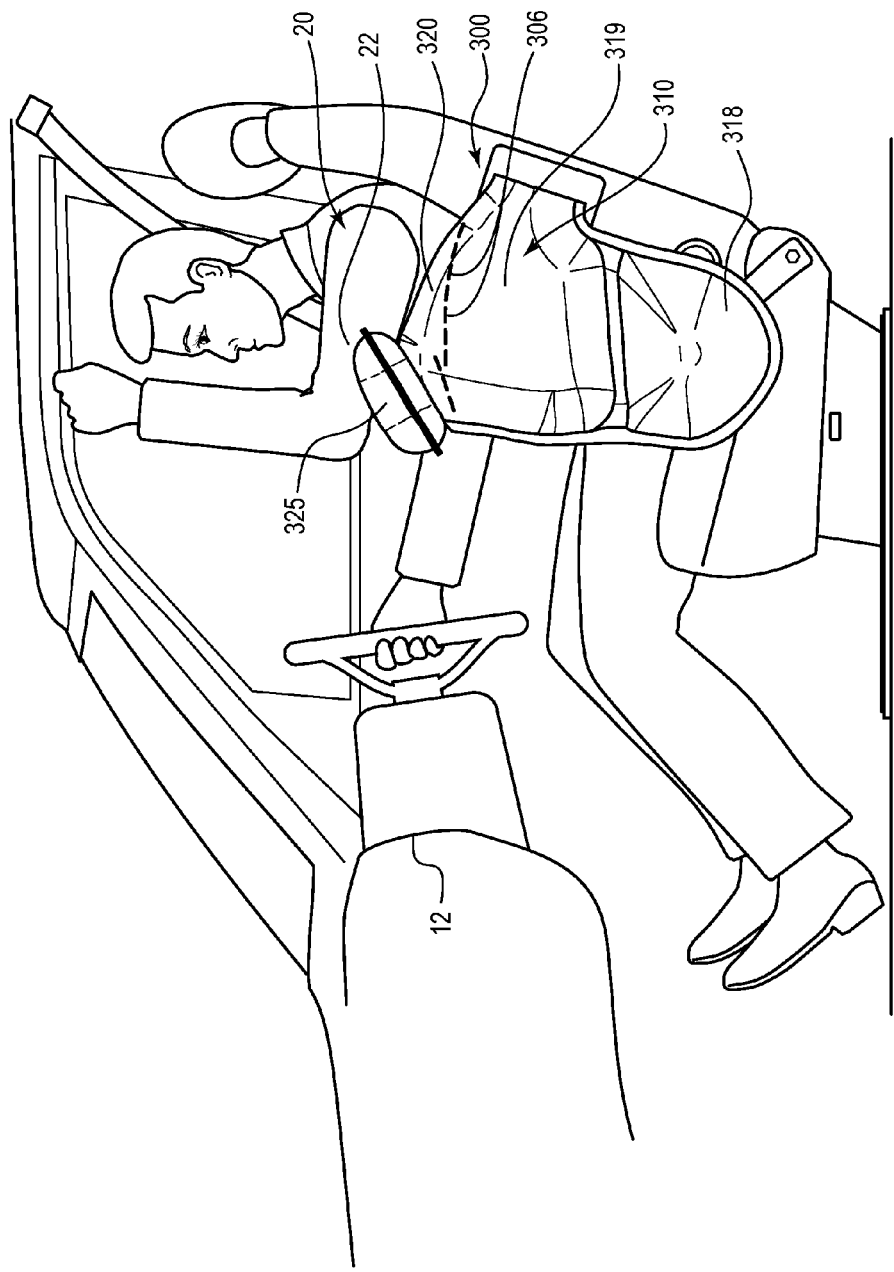
FIG. 7B is a perspective view of the embodiment of an arm-manipulating side airbag of FIG. 7A after the airbag has been deployed and inflated.
Figure 8:
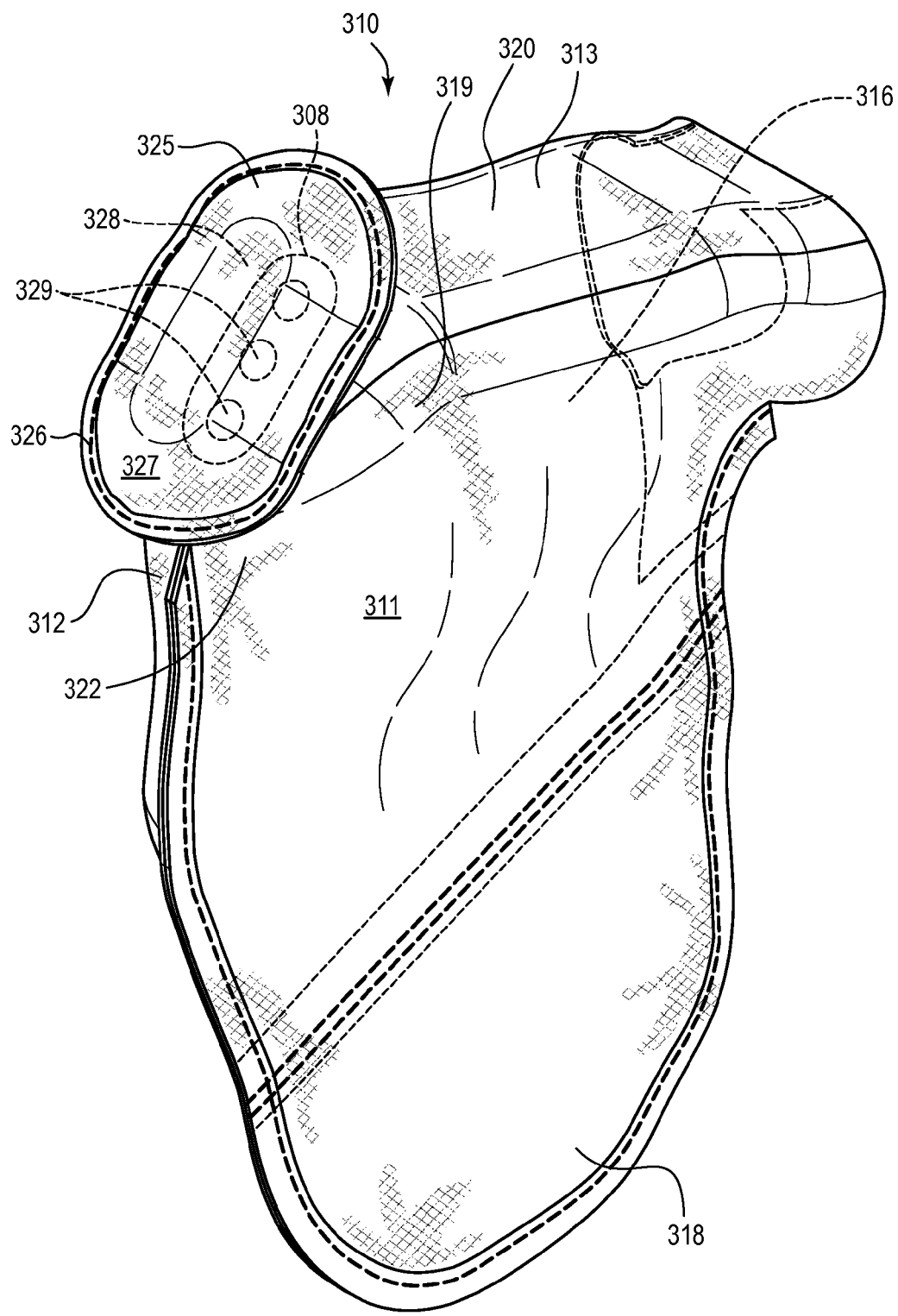
FIG. 8 is a perspective view of the inflatable airbag of FIG. 7B.

FIGS. 7A-8 depict another embodiment of an inflatable side airbag assembly 300 with an airbag 310, wherein assembly 300 resembles assemblies 100 and 200 and airbags 110 and 210, described above, in certain respects. Accordingly, like features may be designated with like reference numerals, with the leading hundreds numeral incremented from "1" or "2" to "3". Any suitable combination of the features described with respect to airbag assemblies 100 and 200, and airbags 110 and 210 can be employed with airbag assembly 300 and airbag 310, and vice versa.

FIGS. 7A-7B depict another embodiment of an airbag assembly 300, wherein the figures depict an interior of a vehicle 10, which comprises an instrument panel 12, and a vehicle seat 18, upon which an occupant 20 is seated. Seat 18 comprises an outboard side 19 on which side airbag assembly 300 may be mounted. Assembly 300 may have a cover 330 through which an airbag may deploy. In FIG. 7A, assembly 300 is in a packaged configuration. An outboard arm 22 of occupant 20 may be in an extended position, as depicted.

FIG. 7B depicts inflatable airbag assembly 300 in a deployed and inflated configuration, wherein a lower chamber 318 and an upper chamber 319 are inflated and are positioned to cushion occupant 20. Top portion 320 may comprise an inflatable button 325, wherein the inflatable button is configured to interact with outboard arm 22 of occupant 20. In an un-inflated and tucked configuration, top portion 320 and button 325 may be inverted into upper chamber 319 such that the top portion and button comprise a tuck. Airbag 310 may be retained in the tucked configuration via tear stitching 306, which in FIG. 7B, has ruptured to allow top portion 320 and button 325 to deploy.

FIG. 8 is a perspective view of inflatable side airbag 310, wherein the airbag comprises outboard panel 311 and inboard panel 312. Airbag 310 may be divided into lower and upper chambers 318 and 319. Inflatable button 325 may be located on top portion 320 of upper chamber 319. Inflatable button 325 may comprise an upper button panel 327 and a lower button panel 328 that are coupled together via a seam 326, which in the depicted embodiment, comprises stitching. The upper and lower button panels 327 and 328 define an inflatable void of button 325 that is in fluid communication with inflatable void 316 of airbag 310 via vent apertures 329. Button 325 may be coupled to airbag 310 at a seam 308, which may comprise stitching. Button 325 may be located on a car-forward portion of airbag 310, such that the button may be described as being located on an upper car-forward portion 320 and 322 of the airbag.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an inflatable side airbag having an inboard panel, an outboard panel, and a top panel, wherein the inboard and outboard panels comprise upper portions and lower portions, and
   wherein the inboard and outboard panels are coupled together at bottom portions of the inboard and outboard panels and each of the upper portions of the inboard and outboard panels are coupled to the top panel, such that the side airbag comprises an upper region and a lower region,
   wherein an average cross-sectional width of the upper region is greater than an average cross-sectional width of the lower region
   wherein the upper region comprises an upper chamber and the lower region comprises a lower chamber,
   wherein the top panel is tucked into the upper chamber and is retained in a tucked configuration prior to deployment of the inflatable side airbag, and
   wherein the top panel is configured such that, after deployment of the lower chamber, inflation gas causes the top panel to become untucked and fully expanded, which expands the width and height of the upper chamber.

2. The inflatable airbag assembly of claim 1, wherein a tether couples the inboard and outboard panels.

3. The inflatable airbag assembly of claim 1, wherein in a deployed and inflated configuration, the upper chamber is configured to fill a void between an outboard vehicle structure and an occupant's outboard arm, such that an occupant's outboard arm is moved by the upper chamber.

4. The inflatable airbag assembly of claim 3, wherein the upper chamber is configured to move an occupant's outboard arm in a car-upward direction.

5. The inflatable airbag assembly of claim 3, wherein the upper chamber is configured to move an occupant's arm in an inboard direction.

6. The inflatable airbag assembly of claim 1, wherein the upper chamber is configured to move an occupant's outboard arm such that the upper chamber fills a void between a car door and an occupant's torso.

7. The inflatable airbag assembly of claim 1, wherein the outboard panel comprises a greater height than the inboard panel such that an attachment point of the outboard panel to the top panel is higher than an attachment point of inboard panel to the top panel.

8. The inflatable airbag assembly of claim 1, wherein a throat portion is in fluid communication with the upper chamber and wherein the throat portion is in fluid communication with the lower chamber only via the upper chamber.

9. An inflatable airbag assembly, comprising
an inflatable side airbag having an inboard panel, an outboard panel, and a top panel, wherein the inboard and outboard panels comprise upper portions and lower portions,
wherein an inflatable button is coupled to the top panel such that the inflatable button is in fluid communication with the inflatable side airbag,
wherein the inboard and outboard panels are coupled together at bottom portions of the panels and each of the upper portions of the inboard and outboard panels are coupled to the top panel, and
wherein the airbag comprises an upper region and a lower region and wherein an average cross-sectional width of the upper region is greater than an average cross-sectional width of the lower region.

10. The inflatable airbag assembly of claim 9, wherein a tether couples the inboard and outboard panels.

11. The inflatable airbag assembly of claim 9, wherein the upper region comprises an upper chamber and the lower region comprises a lower chamber.

12. The inflatable airbag assembly of claim 11, wherein in a deployed and inflated configuration, the upper chamber is configured to fill a void between an outboard vehicle structure and an occupant's outboard arm, such that an occupant's outboard arm is moved by the upper chamber.

13. The inflatable airbag assembly of claim 12, wherein the upper chamber is configured to fill a void between a car door and an occupant's torso.

14. The inflatable airbag assembly of claim 13, wherein the inflatable button is configured to contact an occupant's outboard arm.

15. The inflatable airbag assembly of claim 14, wherein the upper chamber is configured to move an occupant's outboard arm in a car-forward direction.

16. The inflatable airbag assembly of claim 12, wherein the upper chamber is configured to move an occupant's outboard arm in a car-upward direction.

17. The inflatable airbag assembly of claim 12, wherein the upper chamber is configured to move an occupant's outboard arm in an inboard direction.

18. The inflatable airbag assembly of claim 11, the top panel is tucked into the upper chamber and is retained in a tucked configuration prior to deployment of the inflatable side airbag, and
wherein the top panel is beveled configured such that, upon deployment of the inflatable side airbag, inflation gas causes the top panel to become untucked.

19. The inflatable airbag assembly of claim 11, wherein a throat portion is in fluid communication with the upper chamber and wherein the throat portion is in fluid communication with the lower chamber via the upper chamber.

20. The inflatable airbag assembly of claim 11, wherein the inflatable button is fully inflated after the lower chamber.

* * * * *